US008874426B2

(12) United States Patent
Williams (10) Patent No.: US 8,874,426 B2
(45) Date of Patent: Oct. 28, 2014

(54) METHOD FOR TRANSLATING COMPUTER GENERATED LOG FILES

(75) Inventor: Hugh P. Williams, Hampshire (GB)

(73) Assignee: International Business Machines Corporation, Armonk, NY (US)

( * ) Notice: Subject to any disclaimer, the term of this patent is extended or adjusted under 35 U.S.C. 154(b) by 1147 days.

(21) Appl. No.: 12/494,523

(22) Filed: Jun. 30, 2009

(65) Prior Publication Data

US 2010/0332216 A1     Dec. 30, 2010

(51) Int. Cl.
*G06F 17/20*     (2006.01)
*G06F 17/28*     (2006.01)

(52) U.S. Cl.
CPC .................. *G06F 17/2872* (2013.01)
USPC ................. 704/1; 704/3; 704/4; 704/7; 704/8

(58) Field of Classification Search
USPC ......................................... 704/2–9
See application file for complete search history.

(56) References Cited

U.S. PATENT DOCUMENTS

| | | | | | |
|---|---|---|---|---|---|
| 4,864,503 | A | * | 9/1989 | Tolin | 704/2 |
| 4,980,829 | A | * | 12/1990 | Okajima et al. | 704/5 |
| 5,020,021 | A | * | 5/1991 | Kaji et al. | 704/5 |
| 5,201,042 | A | * | 4/1993 | Weisner et al. | 704/2 |
| 5,523,946 | A | * | 6/1996 | Kaplan et al. | 704/2 |
| 5,583,761 | A | * | 12/1996 | Chou | 715/201 |
| 5,751,957 | A | * | 5/1998 | Hiroya et al. | 709/203 |
| 6,092,036 | A | * | 7/2000 | Hamann | 704/8 |
| 6,119,079 | A | * | 9/2000 | Wang et al. | 704/8 |
| 6,275,978 | B1 | * | 8/2001 | Bell | 717/143 |
| 6,492,995 | B1 | * | 12/2002 | Atkin et al. | 715/703 |
| 6,502,064 | B1 | * | 12/2002 | Miyahira et al. | 704/7 |
| 6,507,813 | B2 | * | 1/2003 | Veditz et al. | 704/8 |
| 6,526,426 | B1 | * | 2/2003 | Lakritz | 715/264 |
| 6,539,118 | B1 | | 3/2003 | Murray et al. | |
| 6,782,356 | B1 | * | 8/2004 | Lopke | 704/5 |
| 7,103,532 | B1 | | 9/2006 | Murray et al. | |
| 7,191,114 | B1 | | 3/2007 | Murray et al. | |
| 7,318,021 | B2 | * | 1/2008 | Itoh et al. | 704/5 |
| 7,353,165 | B2 | * | 4/2008 | Zhou et al. | 704/5 |
| 7,721,271 | B2 | * | 5/2010 | Pournasseh et al. | 717/137 |
| 7,788,648 | B2 | * | 8/2010 | Bossom et al. | 717/136 |
| 7,970,598 | B1 | * | 6/2011 | Flanagan et al. | 704/2 |
| 8,180,625 | B2 | * | 5/2012 | Noda | 704/4 |
| 8,201,156 | B1 | * | 6/2012 | Pohorsky et al. | 717/142 |
| 8,209,165 | B2 | * | 6/2012 | Whitelock et al. | 704/2 |
| 2002/0161569 | A1 | * | 10/2002 | Itoh et al. | 704/2 |
| 2008/0126074 | A1 | * | 5/2008 | Whitelock et al. | 704/2 |
| 2010/0100369 | A1 | * | 4/2010 | Shetty et al. | 704/4 |

* cited by examiner

*Primary Examiner* — Matthew Baker
(74) *Attorney, Agent, or Firm* — Gibb & Riley, LLC (57) ABSTRACT

A method of translating a computer generated log output message from a first language to a second language, including receiving a log output containing a plurality of messages in a first language and matching words and phrases in the log output messages to pre-established codes in a matched message index. Ambiguous matches are resolved by removing codes matched to ones of the words and phrases that have overlap with words and phrases matched to different codes. The codes in the matched message index are translated into a second language different than the first language to a corresponding second log output message in the second language and then the second log output message is output in the second language.

20 Claims, 10 Drawing Sheets

Fig. 3

LOG OUTPUT MESSAGE

Say hello! The traditional first computer program will say Hello World! You could say testing testing instead.

Fig. 4

MESSAGE INDEX (100):

ERR1, EN: <say hello>
ERR2, EN: <Hello World>
ERR3, EN: <The traditional first computer program will say {V1}! You could say {V2} instead.>
ERR4, EN: <! >

MATCHED MESSAGE INDEX

| M | Say hello! | The traditional first computer program will say Hello World! You could say testing testing instead. |
|---|---|---|
| (1) | 1111111111 | |
| (2) | | 2222222222 |
| (3) | | 3333333333333333333333333333333333    3333333333 |
| (4) | 44 | 44 |
| (V) | | {V1}           {V2}      ) |
| R1 | 1111111144 | |

Fig. 5

MATCHED MESSAGE INDEX

| M | Say hello! The traditional first computer program will say Hello World! You could say testing testing instead. |
|---|---|
| (1) | ~~1111111~~ |
| (2) | 2222222222 |
| (3) | 33333333333333333333333333333333 333333333333333 333333333 |
| (4) | ~~44~~ |
| (V) | {V1 } {V2 } |
| R1 | 1111111144 |
| x | 11111111 44 |

Fig. 6

MATCHED MESSAGE INDEX

| M | Say hello! The traditional first computer program will say Hello World! You could say testing testing instead. |
|---|---|
| (1) | |
| (2) | 2222222222 |
| (3) | 33333333333333333333333333333333 333333333333333 333333333 |
| (4) | |
| (V) | {V1 } {V2 } |
| R1 | 1111111144 |
| R2 | 333333333333333333333333333333333{V1 }333333333333333{V2 |
| x | 11111111 44 |

METHOD FOR TRANSLATING COMPUTER GENERATED LOG FILES

BACKGROUND

1. Field of the Invention

The embodiments of the invention generally relate to translating computer generated log output files from a first language to a second language.

2. Description of the Prior Art

Log output files are normally generated by computers to save a record of errors encountered during the operation of a computer or a larger computer system or network. Often, the applications that generate these error log output files are legacy versions of particular applications in which no thought has been given to any subsequent translation of the log output files these application generate. Modifying these legacy log output file generation applications for each computer or computer system is disadvantageous with respect to the required modification time and cost.

There exists a need to take log output file containing a plurality of log output messages in a first language and subsequently translate it into another language without modifying the application that generates the log output file messages.

SUMMARY

These and other aspects of the embodiments of the invention will be better appreciated and understood when considered in conjunction with the following description and the accompanying drawings. It should be understood, however, that the following descriptions, while indicating embodiments of the invention and numerous specific details thereof, are given by way of illustration and not of limitation. Many changes and modifications may be made within the scope of the embodiments of the invention without departing from the spirit thereof, and the embodiments of the invention include all such modifications.

An embodiment of the invention includes receiving a log output containing a plurality of messages in a first language, matching words and phrases in the log output messages to pre-established codes in a matched message index, and resolving ambiguous matches by removing codes matched to ones of the words and phrases that have overlap with words and phrases matched to different codes. Thereafter, the codes in the matched message index are translated into a second language different than the first language to a corresponding second log output message in the second language, and finally the second log output message is output in the second language.

Another embodiment of the invention processes the plurality of messages into a canonical form by including at least one message variable field in at least one of the plurality of messages, wherein the message variable field further includes data about a position of the variable field position in the message.

An embodiment of the invention includes an apparatus that includes an input device that receives a log output containing a plurality of messages in a first language and a processor that matches words and phrases in the log output containing a plurality of messages to pre-established codes in a matched message index. The processor resolves ambiguous matches by removing codes matched to ones of the words and phrases that have overlap with words and phrases matched to different codes, and then translates the codes in the matched message index into a second language different than the first language to a corresponding second log output message in the second language. Finally, an output device outputs the second log output message in the second language.

An embodiment of the invention includes a method of translating, and programmable storage medium for storing a program of machine-readable instructions executable by a digital processing apparatus to perform operations supporting the method of translating a computer generated log output message file from a first language to a second language, including the generation of a plurality of messages in the first language and a plurality of messages in the second language corresponding in meaning to the plurality of messages of the first language. A matched message index is created that attempts to identify a correspondence of at least one of the plurality of messages of the first language to at least one character of the computer generated log output message file.

Unknown characters of the computer generated log output message file that have no correspondence to at least one of the plurality of messages of the first language are identified and the unknown characters of the computer generated log output message file are removed from further consideration.

Unique characters of the computer generated log output message file having exclusive correspondence to one of the plurality of messages of the first language are identified, and content of one of a corresponding message in the second language is substituted for the unique characters, and the unique characters of the computer generated log output message file are removed from further consideration.

Ambiguous characters of the computer generated log output file having a correspondence to at least two of the plurality of messages of the first language are identified where each of the corresponding characters are completely contained within characters of the computer generated log output file corresponding to another of the plurality of messages. The ambiguous characters of the computer generated log output message file are then removed from further consideration.

The steps of the identification of the unique characters, substituting their respective content, removing the unique characters from consideration, the identification and removal of the ambiguous characters are repeated until no more ambiguous characters are identified and all the identified unique characters have been substituted with content of corresponding messages of the second language.

A further embodiment of the invention includes an apparatus that translates a computer generated log output message file from a first language to a second language, including an input device that inputs the computer generated log output message file and a plurality of messages in the first language and a plurality of messages in the second language corresponding in meaning to the plurality of messages of the first language.

An indexer creates a matched message index in the first language that identifies whether there is any correspondence of at least one of the plurality of messages to at least one character of the computer generated log output message file.

A processor identifies unknown characters of the computer generated log output message file having no correspondence to the at least one of the plurality of messages of the first language and removes the unknown characters of the computer generated log output message file from further consideration.

The processor further identifies unique characters of the computer generated log output message file having exclusive correspondence to one of the plurality of messages of the first language, substitutes content of one of a corresponding message in the second language for the unique characters, and removes the unique characters of the computer generated log output message file from further consideration.

The processor further identifies ambiguous characters of the computer generated log output file having a correspondence to at least two of the plurality of messages of the first language where each of the corresponding characters are completely contained within characters of the computer generated log output file corresponding to another of the plurality of messages, and removes the ambiguous characters of the computer generated log output message file from further consideration.

The steps of identifying the unique characters, substituting content, removing the unique characters, identifying the ambiguous characters and removing the ambiguous characters are repeated by the processor until no more ambiguous characters are identified and all the identified unique characters have been substituted with content of corresponding messages of the second language. An output device outputs the substituted content of the corresponding message of the second language.

Embodiments of the invention allow an application that generates log output messages to not be modified, which has a double benefit that the original log output is still immediately readable in the native language (to a native user), and the invention may be applied to interpret error log messages from older versions of a log generation application in which no thought may have been given to any subsequent translation of log output files.

BRIEF DESCRIPTION OF THE DRAWINGS

The embodiments of the invention will be better understood from the following detailed description with reference to the drawings, in which.

DETAILED DESCRIPTION OF EMBODIMENTS

The embodiments of the invention and the various features and advantageous details thereof are explained more fully with reference to the non-limiting embodiments that are illustrated in the accompanying drawings and detailed in the following description. It should be noted that the features illustrated in the drawings are not necessarily drawn to scale. Descriptions of well-known components and processing techniques are omitted so as to not unnecessarily obscure the embodiments of the invention. The examples used herein are intended merely to facilitate an understanding of ways in which the embodiments of the invention may be practiced and to further enable those of skill in the art to practice the embodiments of the invention. Accordingly, the examples should not be construed as limiting the scope of the embodiments of the invention.

According to one embodiment of the invention, a log output containing a plurality of messages in a first language is received, and the words and phrases are matched to pre-established codes in a matched message index. Exact matches are translated into a second language and ambiguous matches are resolved by removing codes matched to words and phrases that have an overlap with words and phrases matched to different codes. Once these ambiguous matches have been identified by removing the codes corresponding to overlapping words and phrases, the codes in the matched message index are translated into a second language different than said first language to a corresponding second log output message in the second language and output.

Figure 1:
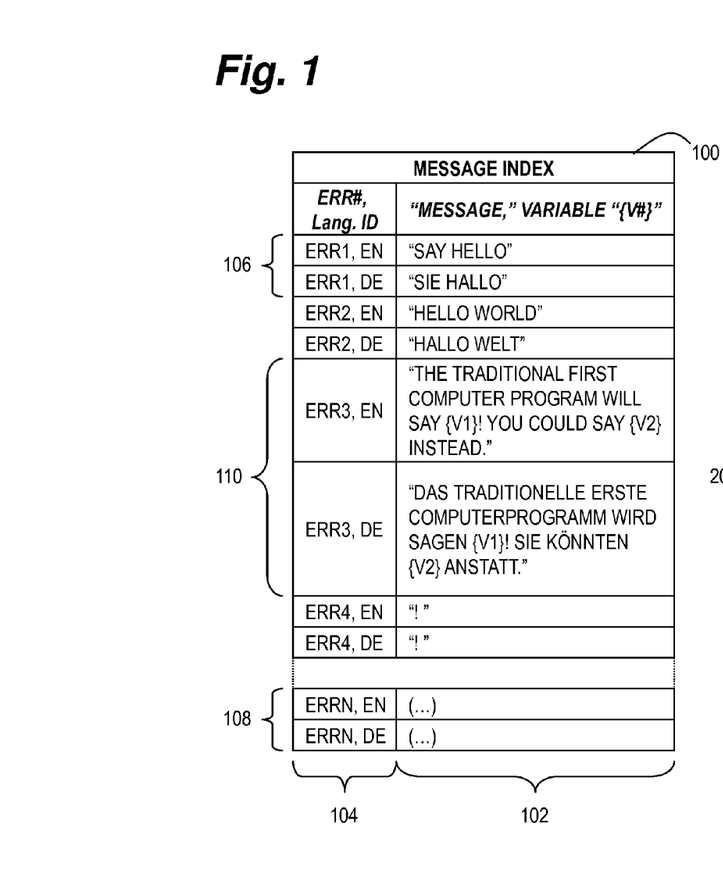
FIG. 1 is a representative illustration of a message index.

FIG. 1 is a representative illustration of an internationalized message index 100 created by processing error messages 102 according to an index 104 that includes a message identifier and a language identifier. The message identifier may be a code, (for example, ERR1, at reference number 106), shared by an equivalent message translated into a different language having a language identifier, (for example, "EN," (English), "DE", (German). In practice, a software application's message catalogues will be used to generate this message index 100.

For example, "SAY HELLO" and "SIE HALLO" may be both indexed "ERR1," at 106, since they represent the same message in English and German. The language descriptors, "EN" and "DE" differentiate the associated language of the same message. A message index comprising a software application's message catalogues may include many associated messages, or indexed error messages, represented for example in FIG. 1 by, ERR2, ERR3, ERR4 ... ERRN at 108, representing the nth indexed error message in corresponding EN and DE languages. FIG. 1 illustrates only two languages (EN, DE) for a single message, e.g., ERR1, however, more than two languages for a single message may be included, for example, "ERR1, IT, "DIRE CIAO,"" for Italian, or "ERR1, FR, "DIRE BONJOUR,"" for French.

Figure 2:
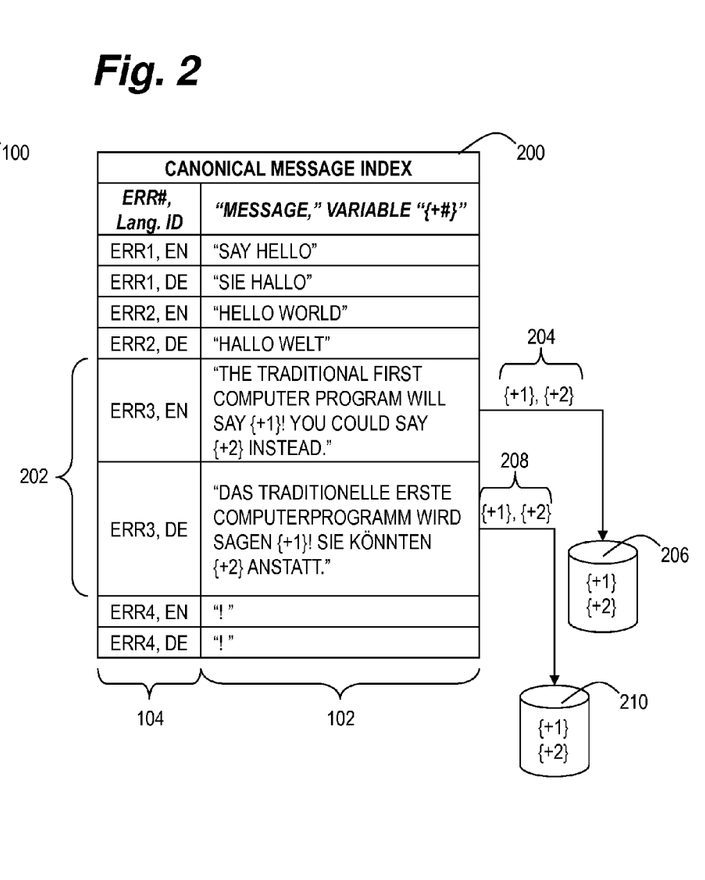
FIG. 2 is a representative illustration of a canonical message index.

FIG. 2 represents a canonical message index 200 created from the message index 100 by turning the error messages 102 into a canonical form that allows for code page variations and variable fields within the body of the messages. For example, ERR3, EN at reference number 110 of FIG. 1 associates the message, "THE TRADITIONAL FIRST COMPUTER PROGRAM WILL SAY {V1}! YOU COULD SAY {V2} INSTEAD," that includes variables "V1" and V2." In FIG. 2, these variables are extracted from the message, (illustrated as "+1" and "+2", respectively, at 204), and may be stored in a variable storage device 206. Additionally, variables "V1" and "V2" in the indexed error message "ERR3, DE" may be extracted from the message, (again, illustrated as "+1" and "+2", respectively, at 208), and may be stored in a variable storage device 210. These stored variables may have additional information stored with respect to which particular message they were extracted from and the particular location in the message they were extracted from, as either as part of the regular expression or in a separate data structure. Regular expressions in 8-bit UCS/Unicode Transformation Format (UTF8) may be utilized for such a canonical form, but other encoding systems are possible.

Figure 3:
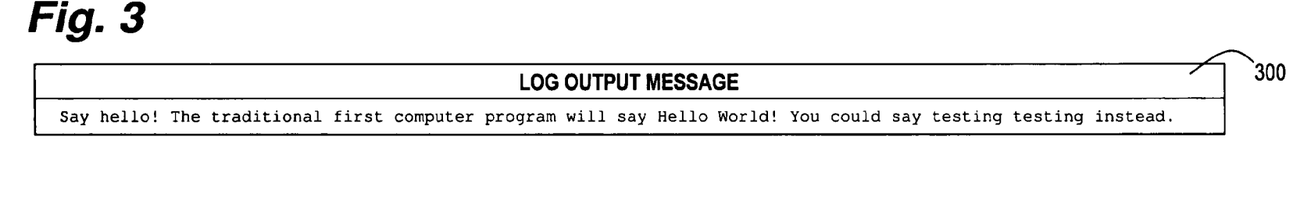
FIG. 3 is a representative illustration of a log output message file.

FIG. 3 is a representative illustration of a log output message file 300 containing the single message, "Say hello! The traditional first computer program will say Hello World! You could say testing testing instead." This single message is representative of one message in log output file that may contain a large number of messages. For illustrative purposes, the following disclosure only focuses on a single log output message from a log output file that may contain a large number of messages, all of which may be processed in a similar manner.

Figure 4:
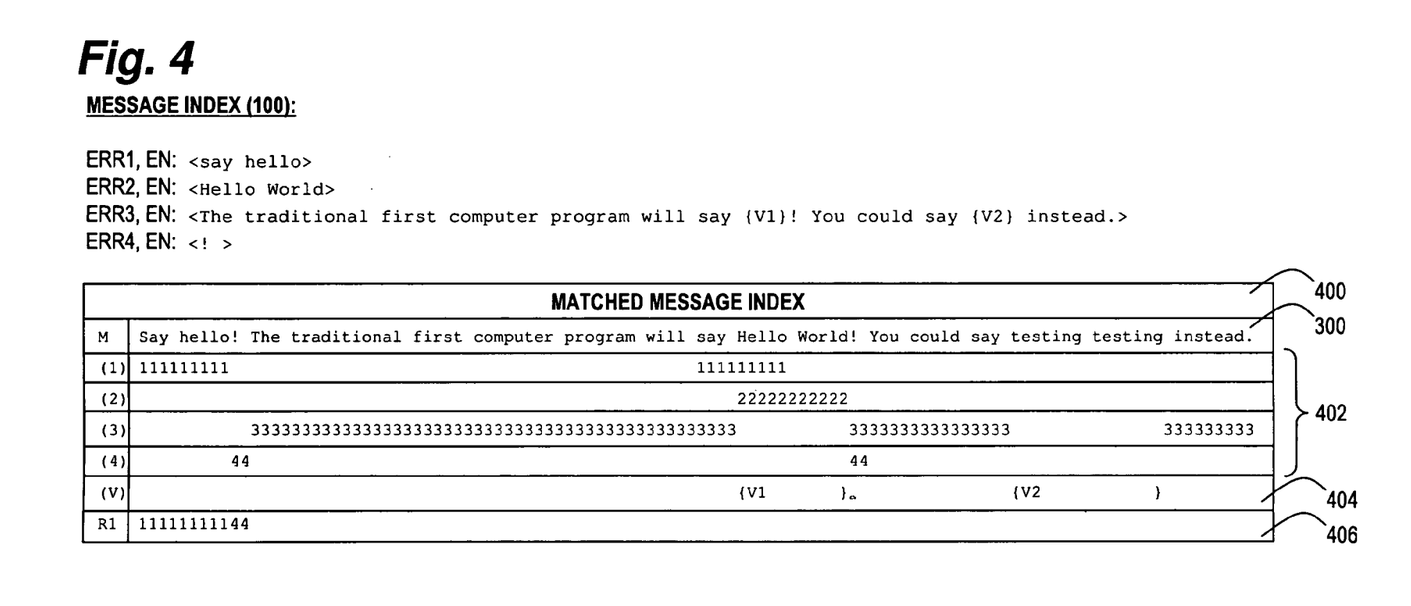
FIG. 4 is a representative illustration of a message index and an accompanying matched message index associated with the log output message.

FIG. 4 is a representative illustration of a portion of a message index, (similar to the contents of message index 100 of FIG. 1), and an accompanying matched message index 400 associated with the log output message 300 of FIG. 3. For example, the message index 100 according to FIG. 1, includes indexed error messages ERR1-ERR4 in English (EN), the native language of the computer generated log output message 300:

ERR1, EN "say hello";
ERR2, EN "Hello World";
ERR3, EN, "The traditional first computer program will say {V1}! You could say {V2} instead."; and
ERR4, EN, "!".

The log output message 300, (as denoted as "M" in the left column), as first illustrated in FIG. 3, is analyzed character by character for each of the indexed error messages, ERR1-ERR4, of the message index 100. Particular indexed error messages of the message index 100 used in analyzing the characters of the log output message 300 may be preliminary determined by a primary spoken language key (not illustrated) applied to the log output message 300. Once a satisfactory match between the primary spoken language key to the log output message is made, all indexed error messages corresponding to that determined primary key language are used to analyze the log output message file 300.

The rows (1)-(4) identified by reference number 402 are associated with each of the corresponding error messages, ERR1-ERR4. Each character of the log output message is analyzed for any occurrence of a character, word or phrase of each of the error messages, ERR1-ERR4. For example, row (1) identifies indexed error message ERR1, EN in two places in the log output message 300. Row (2) identifies the indexed error message ERR2, EN in one place in the log output message 300. Row (3) identifies the indexed error message ERR3, EN in one place in the log output message 300 which further includes characters within the parameters of two variable expressions V1 and V2, (where characters within these variable fields are excluded from consideration and stored, for example, in storage location 206/210 of FIG. 2), see reference number 404 at the row (V) in the matched message index 400. And finally, row (4) identifies the indexed error message ERR4, EN in two places in the log output message 300.

Iterating through each indexed error message marks every character which might match a particular indexed error message entry, excluding variable fields. The result of this step is a large matched message index 400 in which every character of the log output message, (and subsequently the entire log output message file), can be linked to zero or more such indexed error messages. Any characters in the log output message having no identified source or corresponding indexed error message may be classified as "unknown," and may be eliminated from further consideration. Characters in the log output message having only one identified single source or corresponding indexed error message may be classified or tagged as "unique." Finally, any characters in the log output message identified as having two or more corresponding indexed error messages are considered "non-unique" or ambiguous matches.

All "unique" matches are first identified by identifying any characters that are exclusively associated with a single indexed error message. For example, in FIG. 4, the portion of the log output message 300, "Say hello!" is associated with indexed error message ERR1, EN, "Say hello," and indexed error message ERR4, EN "!", and therefore these are "unique" matches. In other words, when there is no vertically overlapping indexed error message identification in the matched message index 400 for characters in the log output message, those characters identified with the corresponding indexed error message are tagged as "unique." These "unique" matches are identified, denoted by row R1 and reference number 406 of FIG. 4, the "unique" association between the indexed error message the particular portion of the log output message is stored for later association with a corresponding indexed error message in a second language to be substituted for translation, and the occurrence from matched message index 400 is then removed from further consideration.

Figure 5:
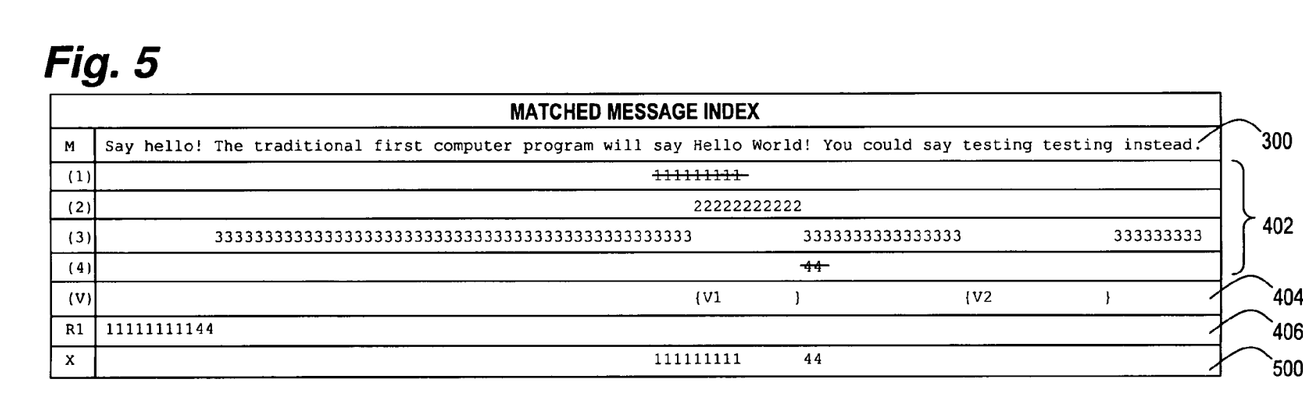
FIG. 5 is a representative illustration of the matched message index of FIG. 4.

FIG. 5 is a representative illustration of the matched message index 400 of FIG. 4 that further identifies and removes any "non-unique" or ambiguous matches from the matched message index 400. For example, the second occurrence of the indexed error message ERR1, EN, "say Hello" is identified as a "non-unique" or ambiguous match since these characters are completely coincident with or completely overlap with at least one other indexed error message in the matched message index 400, namely, indexed error messages ERR2, EN "Hello World" and ERR3, EN, "The traditional . . . say . . . ". An additional example is the second occurrence of the indexed error message ERR4, EN "!" may be identified as a "non-unique" or ambiguous match since it is completely coincident with or completely overlaps the indexed error message ERR3, EN, "The traditional . . . World! You . . . ". Both of these "non-unique" or ambiguous matches are removed from further consideration in the matched message index 400 as illustrated by the contents of row X at 500.

In other words, in line (1) of the chart shown in FIG. 5 the characters of second occurrence of "say Hello" are represented by "111111111." This "111111111" representation partially overlaps the "222222222222" representation shown in line (2) of FIG. 5 and partially overlaps the "333 . . . 333" representation shown in line (3) of FIG. 5. Therefore, this occurrence of "say Hello" is ambiguous because all of the "111111111" representations overlap the "2" and the "3." In this instance the "111111111" representation is completely coincident or completely overlaps another indexed error message and it is removed. A similar situation occurs in line (4) of FIG. 5 where the second occurrence of "!", which is represented by "44" completely overlaps the "333 . . . 333" in line (3). Note that, as shown in FIG. 5 other envisions that are only partially overlapped by other representations are not removed. Therefore, the "2222222222" in line (2) of FIG. 5 is not removed because it only partially overlap the "111111111" representation. Through various iterations, this process will identify and remove any ambiguous matches.

Figure 6:
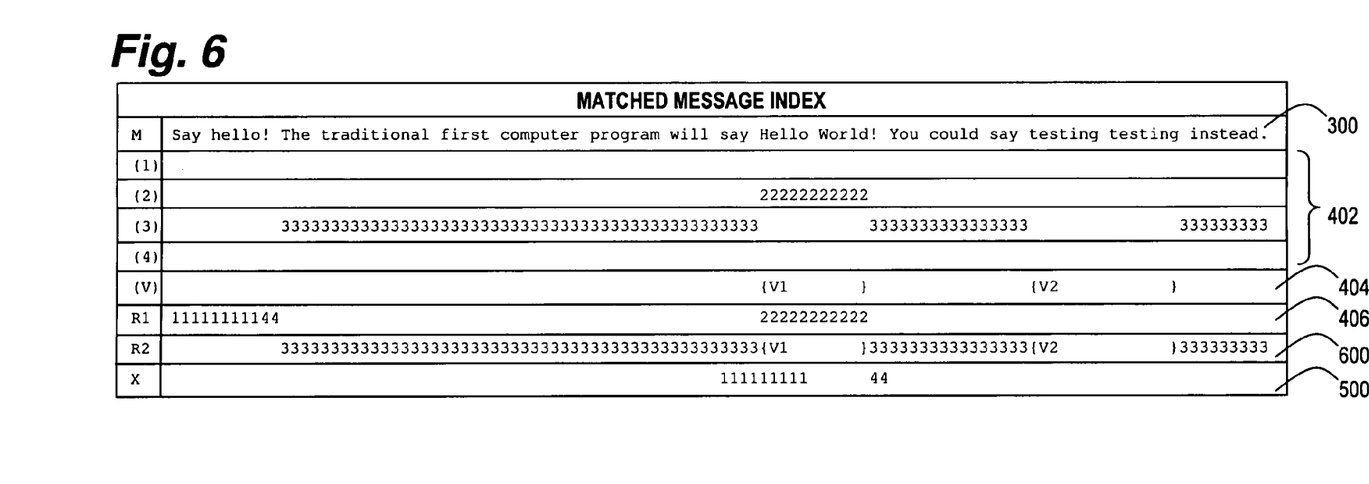
FIG. 6 is a representative illustration of the matched message index of FIGS. 4-5.

FIG. 6 is a representative illustration of an iterative process to resolve any more "unique" matches that may be presented after the previous removal of any "non-unique" matches described above in FIG. 5. After each pass of removing "non-unique" characters from the log output message 300, more characters may be identified as being potentially "unique" matches to indexed error message entries. For example, in FIG. 6 indexed error messages ERR2, EN and ERR3, EN now are associated with corresponding portions of the log output message 300 that have no other overlapping indexed error messages, and are thereby resolved as being "unique." The text, "Hello World" is resolved (as shown in row R1, at 406), and the text, "The traditional first computer program will say {V1}! You could say {V2} instead," is additionally resolved (as shown in row R2, 600), and may include placement for variable fields V1 and V2.

The process is stopped when the matched message index 400 is scanned and no matches are identified as being "non-unique." The method now establishes a direct link from each character in the log output message to an indexed error message (if any) which created it. Some characters may still have two or more matches, since this can only occur if some of the original log output messages were identical. The origin of such characters is beyond the scope of this disclosure, but in practice, an arbitrary choice for the original message can be made and the matched message index 400 may be identified as having ambiguous messages. Substitution for these ambiguous messages may be based on a priority match-order basis of indexed error messages, or notification to a user requiring user intervention.

Figure 7:
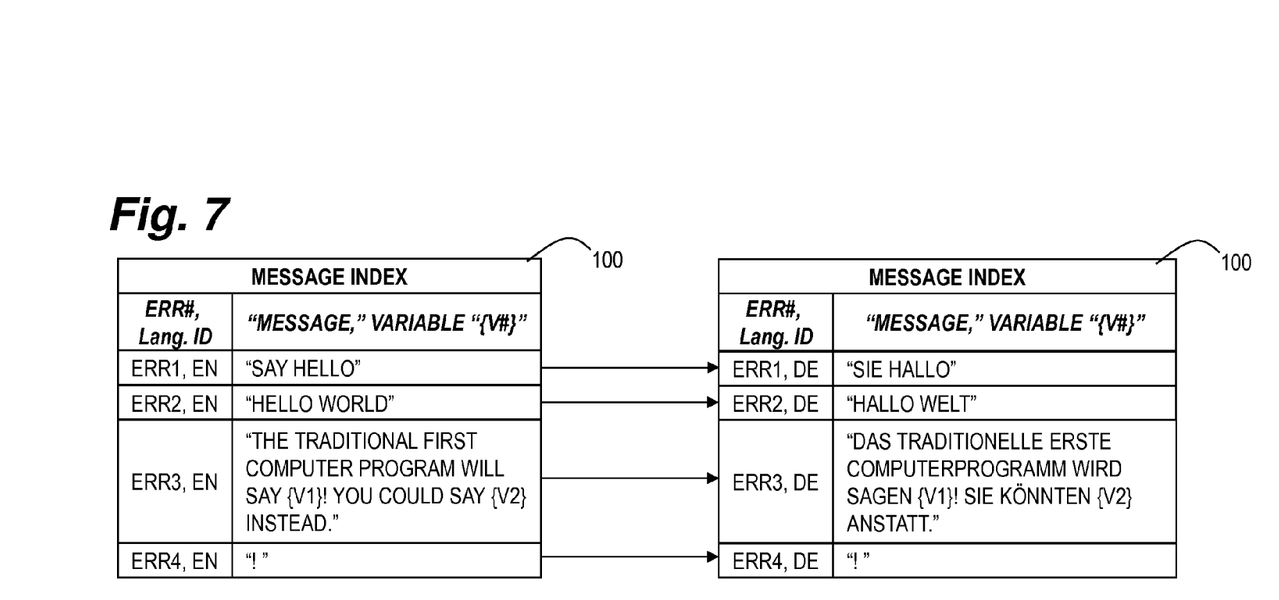
FIG. 7 is representative illustration of the indexed error messages in a first language of the message index of FIG. 1 corresponding to indexed error messages of a second language.

FIG. 7 illustrates an alternative representation of FIG. 1 where the indexed error messages of the message index 100 in a first language, denoted as "EN" for English, directly correspond to a correlating indexed error message of a second language, denoted as "DE" for German.

Figure 8:
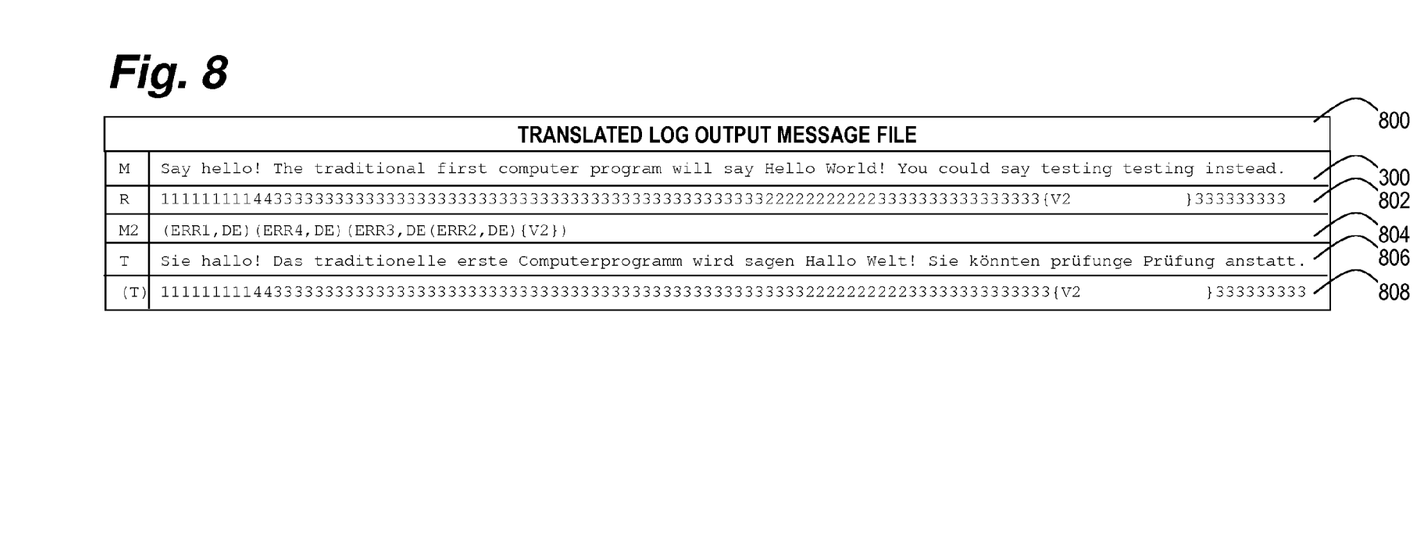
FIG. 8 is representative illustration of a translated log output message file.

FIG. 8 illustrates a translated log output message file 800 that substitutes the matched message index 400 in the first language (EN) associated with the resolved matches (R1 and R2 of FIGS. 4-6, now consolidated in row R, at 802) of the matched message index 400 that translates the log output message into a corresponding second language (DE). For example, row R, at 802 illustrates the finally resolved indexed error messages for the log output message 300. Note that {V1} has been substituted with the indexed error message ERR2, EN, and {V2} remains in the expression. Row M2, at 804, illustrates the new message order and nesting of the indexed error messages and variables of the indexed error messages names utilized in this description. Row T, at 806, illustrates the translation using the corresponding indexed error messages ERR1, DE to ERR4, DE, and the translation of the variable {V2}, as "prüfunge Prüfung", (see ERR3, DE in FIG. 1). Row (T), at 808, illustrates a numerical representation of the indexed error messages from row T, at 806, including the variable field {V2}.

The indexed error messages in the second or target language may be substituted for the original log output message to including any extracted and stored variable fields from the first language that may have been either translated in another iteration, translated independently, or not translated at all, since their characters do not form part of the actual log output message that is considered by the matched message index 400.

The above steps of identifying and resolving "unique" matches, identifying and removing "non-unique" matches, and substituting the second target indexed error message (and variables), may happen simultaneously with the generation of the log output file or may process stored log output message files.

Figure 9A:
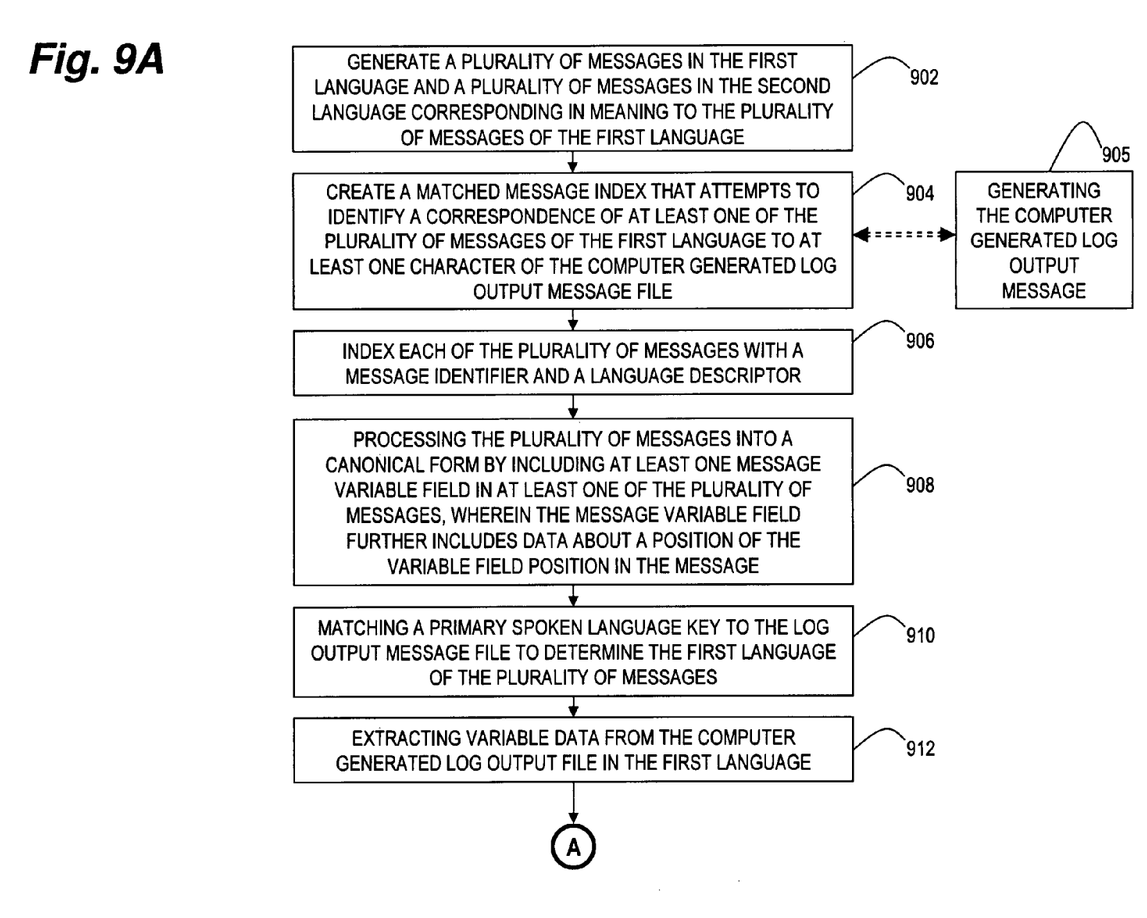
FIG. 9A is a flow diagram illustrating a first portion of a method of translation a log output file from a first language to a second language.
Figure 9B:
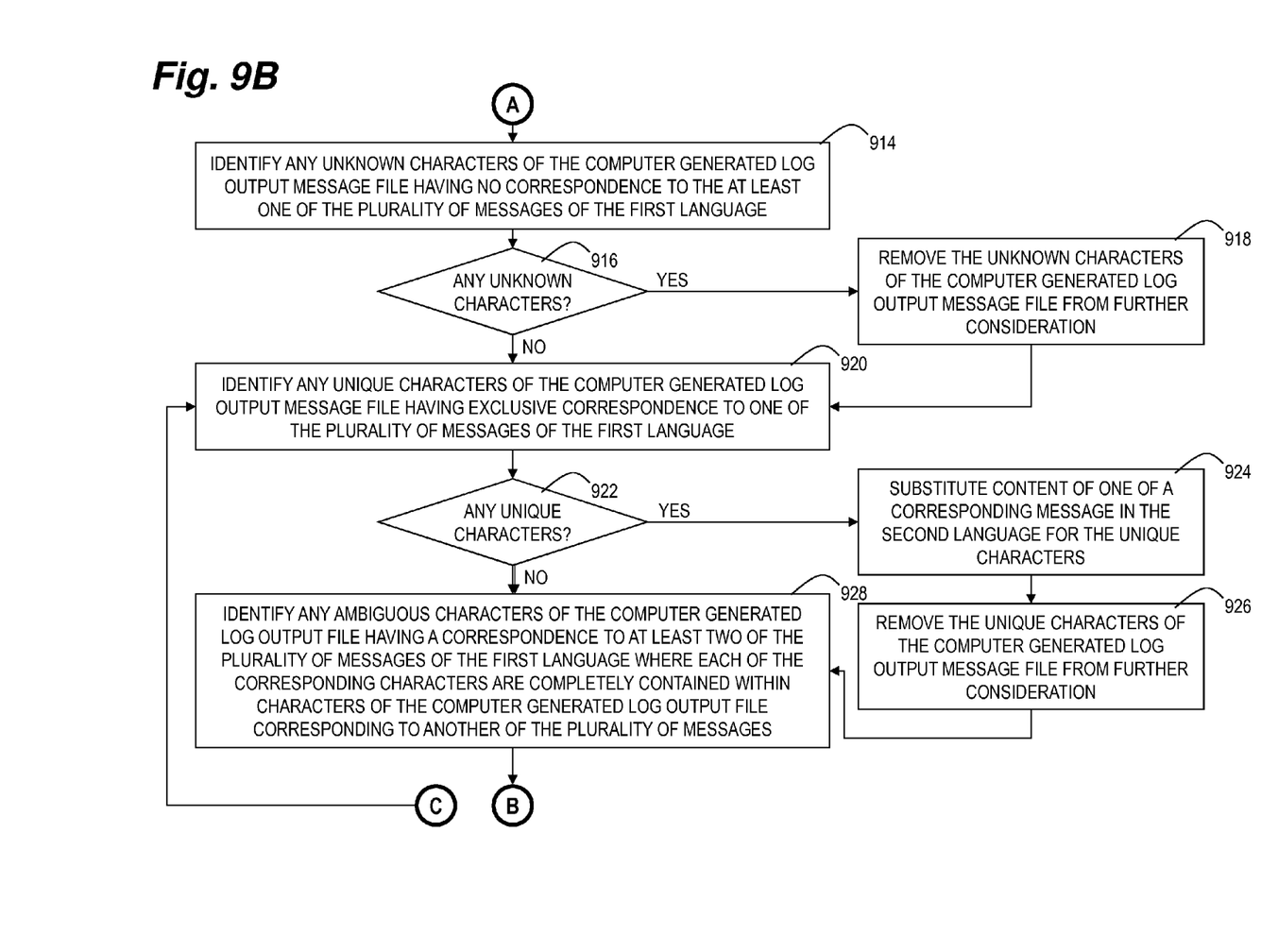
FIG. 9B is a flow diagram illustrating a second portion of a method of translation a log output file from a first language to a second language.
Figure 9C:
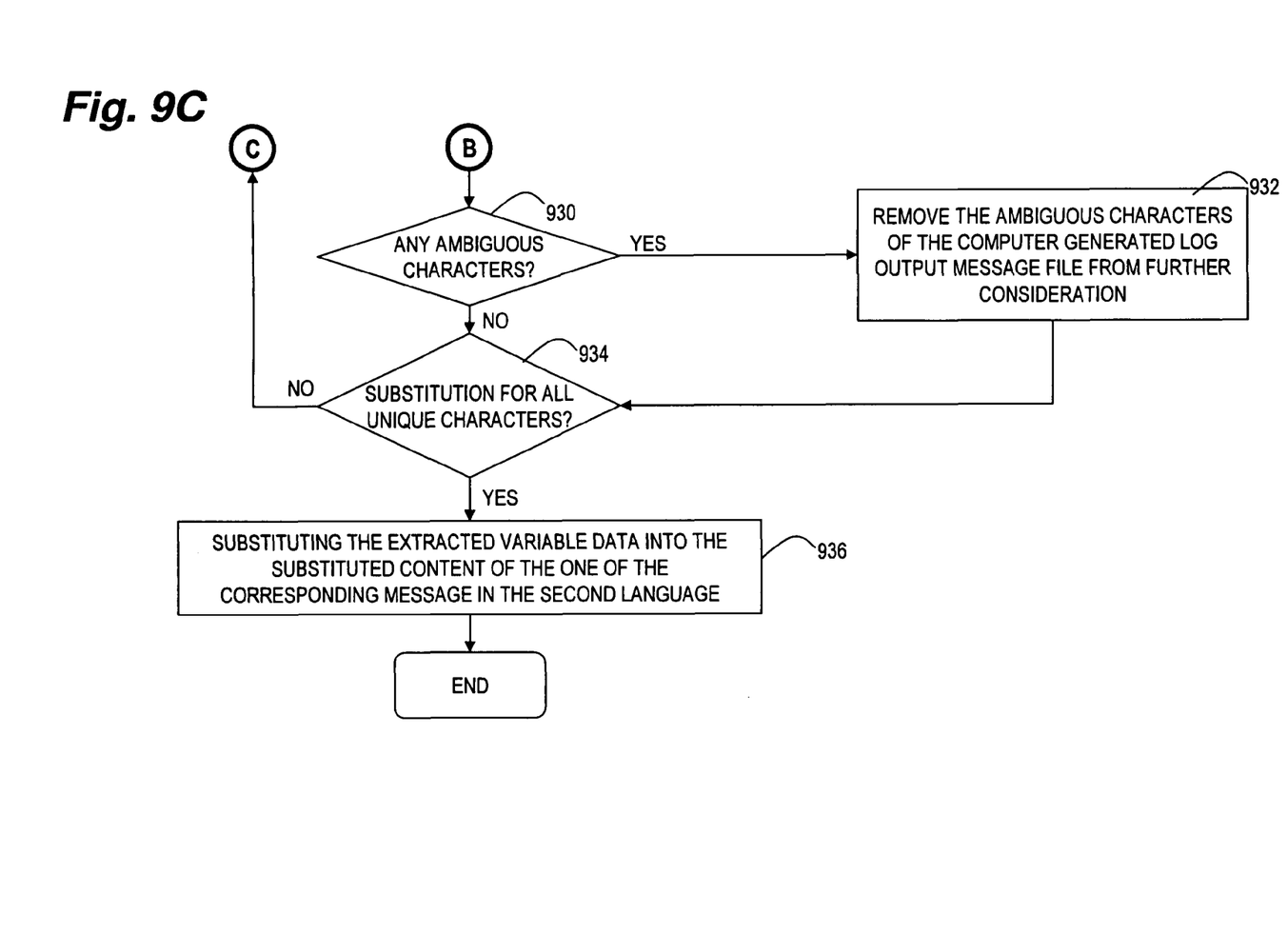
FIG. 9C is a flow diagram illustrating a third portion of a method of translation a log output file from a first language to a second language.

FIGS. 9A-9C illustrate a flow diagram of a method of translation of a log output file from a first language to a second language.

One embodiment of a method generates a plurality of messages in the first language and a plurality of messages in the second language corresponding in meaning to the plurality of messages of the first language 902. The method creates a matched message index that attempts to identify a correspondence of at least one of the plurality of messages of the first language to at least one character of the computer generated log output message file 904. The method may include creating the matched message index simultaneously with the generation of the computer generated log output message 905. The method indexes each of the plurality of error messages with a message identifier and a language descriptor 906.

The method may process the plurality of messages into a canonical form by including at least one message variable field in at least one of the plurality of messages, where the message variable field further includes data about a position of the variable field position in the message 908.

The method may then match a primary spoken language key to the log output message file to determine the first language of the plurality of messages 910. An alternative embodiment may have a user input the primary spoken language and a target translation language.

The method may then extract variable data from the computer generated log output file in the first language 912, for later substituting the extracted variable data into the substituted content of the one of the corresponding message in the second language.

The method identifies any unknown characters of the computer generated log output message file having no correspondence to the at least one of the plurality of messages of the first language 914. If any unknown characters exist 916, then the unknown characters of the computer generated log output message file are removed from further consideration 918.

The method identifies any unique characters of the computer generated log output message file having exclusive correspondence to one of the plurality of messages of the first language 920. If any unique characters exist, 922, content of one of a corresponding message in the second language is substituted for the unique characters, 924 and the unique characters of the computer generated log output message file are removed from further consideration 926.

The method identifies any ambiguous characters of the computer generated log output file having a correspondence to at least two of the plurality of messages of the first language where each of the corresponding characters are completely contained within characters of the computer generated log output file corresponding to another of the plurality of messages 928. If any ambiguous characters of the computer generated log output message file are determined to exist 930, they are then removed from further consideration 932.

These above methods of identifying the unique characters 914-916, substituting content 924, and removing the unique characters 926, identifying the ambiguous characters 928-930 and removing the ambiguous characters 932 are repeated until no more ambiguous characters are identified and all the identified unique characters have been substituted with content of corresponding messages of the second language 934.

The method may then substitute the extracted variable data into the substituted content of the one of the corresponding message in the second language 936.

Figure 10:
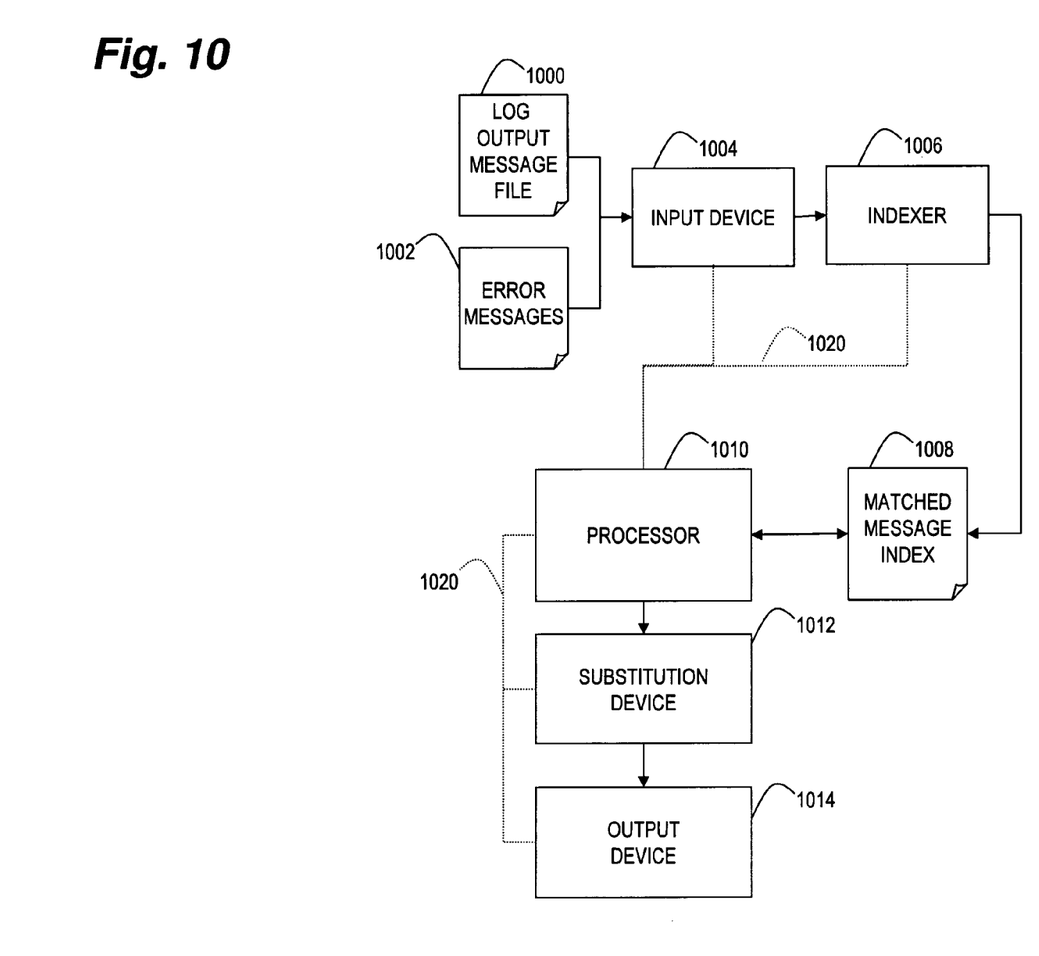
FIG. 10 is a schematic diagram illustrating a device used for a translating a log output file from a first language to a second language.

FIG. 10 illustrates another embodiment of an apparatus that translates a computer generated log output message file from a first language to a second language.

This embodiment includes an input device 1004 that inputs a computer generated log output message file 1000 and a plurality of error messages 1002 in a first language and a plurality of messages in the second language corresponding in meaning to the plurality of messages of the first language. An indexer 1006 creates a matched message index 1008 in a first language that identifies whether there is any correspondence of at least one of the plurality of error messages to at least one character of the computer generated log output message file 1000. A processor 1010 identifies unknown characters of the computer generated log output message file 1000 having no correspondence to at least one of the plurality of messages in the matched message index 1008 in the first language and removes the unknown characters of the computer generated log output message file from further consideration.

The processor 1010 further identifies unique characters of the computer generated log output message file 1000 having exclusive correspondence to one of the plurality of messages of the first language, substitutes content of a corresponding message in the second language for the unique characters at a substitution device 1012, and removes the unique characters of the computer generated log output message file from further consideration by the processor 1010. The processor 1010 further identifies ambiguous characters of the computer generated log output file 1000 having a correspondence to at least two of the plurality of messages of the first language in the matched message index file 1008 where each of the corresponding characters are completely contained within characters of the computer generated log output file corresponding to another of the plurality of messages, wherein the processor 1010 causes the removal of the ambiguous characters of the computer generated log output message file from further consideration.

The processor repeats the steps of identifying the unique characters, substituting content, removing the unique characters, identifying ambiguous characters and removing the ambiguous characters until no more ambiguous characters are identified and all the identified unique characters have been substituted with content of corresponding messages of the second language. An output device 1014 outputs the substituted content of the corresponding message of the second language thereby providing a translation in a target (second) language of the log output error message file 1000. A bus 1020 is connected to input device 1004, indexer 1006, processor 1010, substitution device 1012, and output device 1014.

Figure 11:
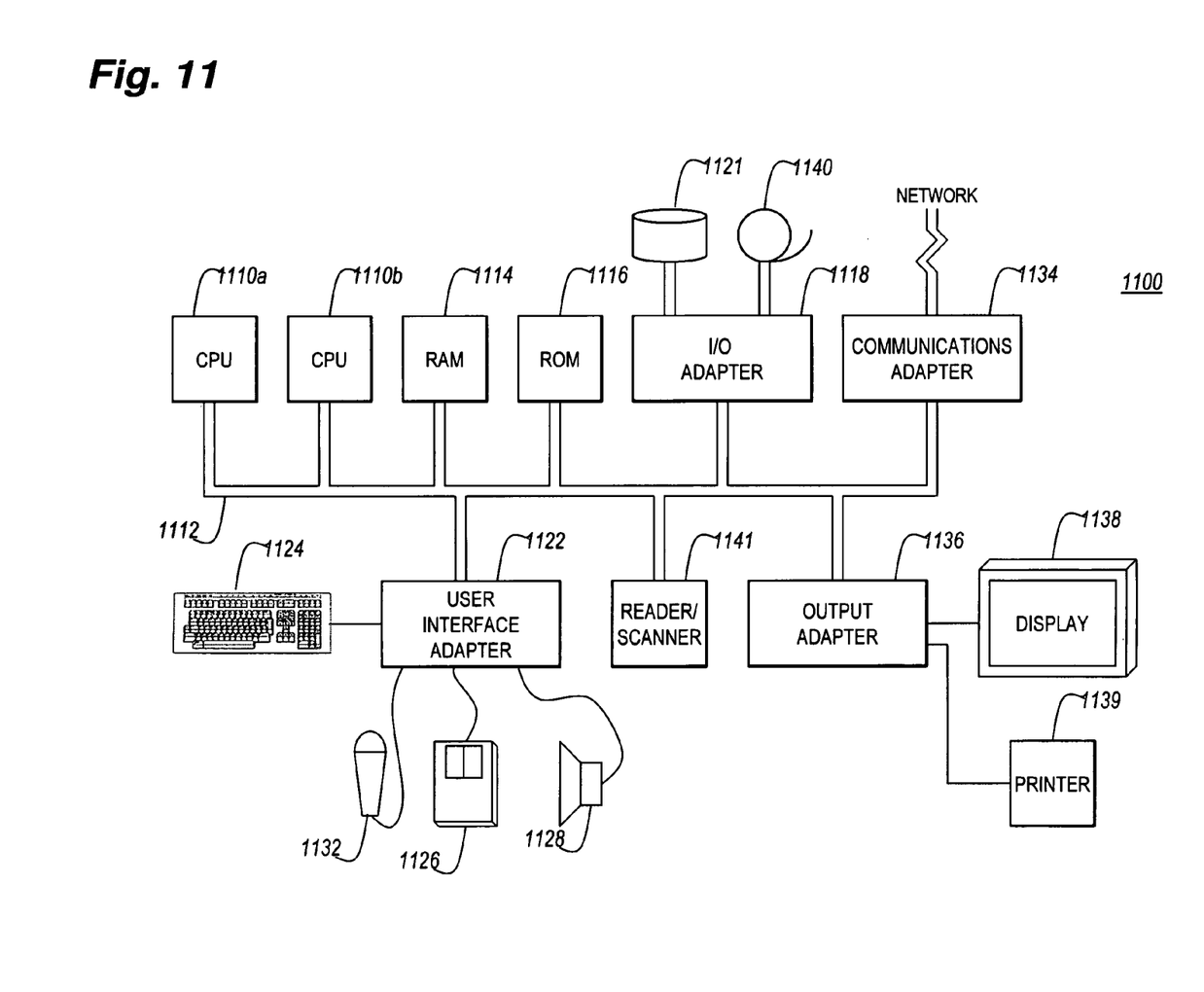
FIG. 11 illustrates a typical hardware configuration which may be used for implementing the inventive system and a method of translation a log output file from a first language to a second language.
Figure 12:
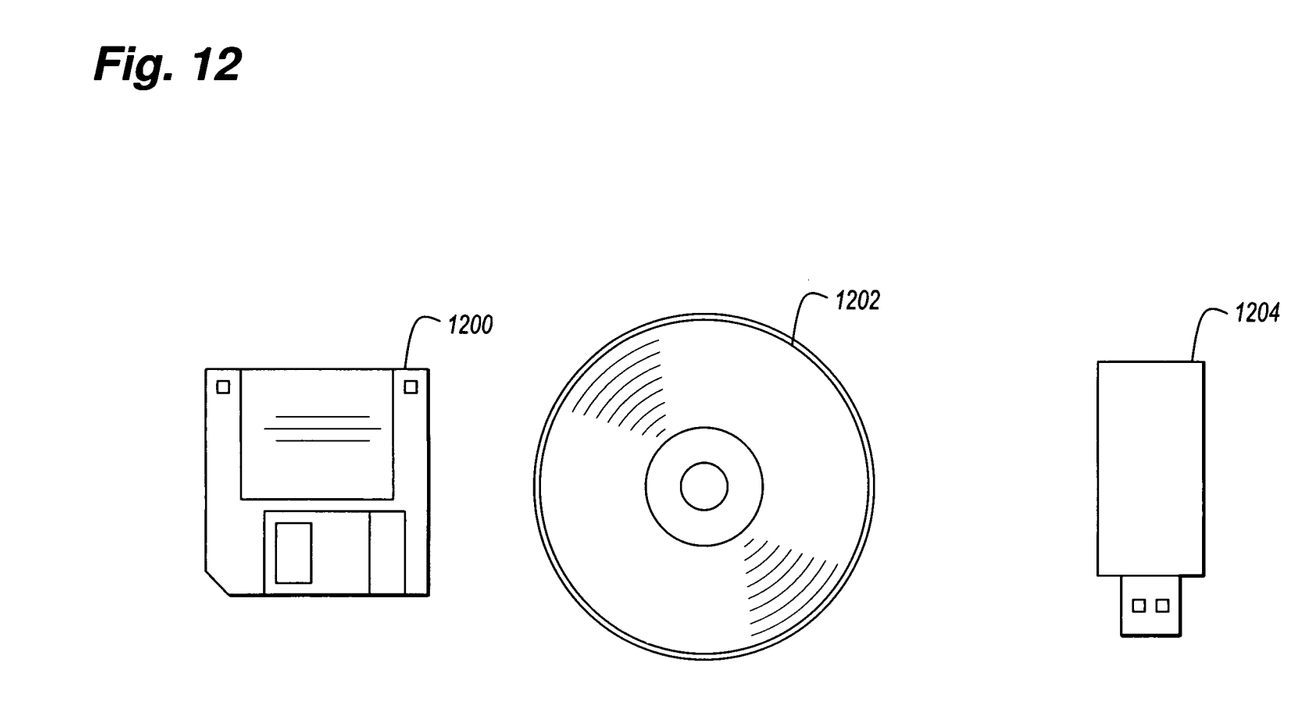
FIG. 12 illustrates a representative signal-bearing media, such as a magnetic data storage diskette, CD-ROM or portable memory device used with a method of translation a log output file from a first language to a second language.

Another embodiment as illustrated in FIGS. 11-12 is a computer-controlled system 1100 and a programmable storage media 1200-1204 for storing a program of machine-readable instructions executable by a digital processing apparatus (1100 generally) to perform operations supporting a method of translating a computer generated log output message file from a first language to a second language.

FIG. 11 illustrates a typical hardware configuration 1100 which may be used for implementing the inventive system and a method of translation a log output file from a first language to a second language.

The configuration has preferably at least one processor or central processing unit (CPU) 110*a*, 110*b*. The CPUs 110*a*, 110*b* are interconnected via a system bus 1112 to a random access memory (RAM) 1114, read-only memory (ROM) 1116, input/output (I/O) adapter 1118 (for connecting peripheral devices such as disk units 1121 and tape drives 1140 to the bus 1112), user interface adapter 1122 (for connecting a keyboard 1124, mouse 1126, speaker 1128, microphone 1132, and/or other user interface device to the bus 1112), a communication adapter 1134 for connecting an information handling system to a data processing network, the Internet, and Intranet, a personal area network (PAN), etc., and a output adapter 1136 for connecting the bus 1112 to a display device 1138 and/or printer 1139. Further, an automated reader/scanner 1141 may be included. Such readers/scanners are commercially available from many sources.

In addition to the system described above, a different aspect of the invention includes a computer-implemented method for performing the above method. As an example, this method may be implemented in the particular environment discussed above.

Such a method may be implemented, for example, by operating a computer, as embodied by a digital data processing apparatus, to execute a sequence of machine-readable instructions. These instructions may reside in various types of signal-bearing media.

Thus, this aspect of the invention is directed to a programmed product, including signal-bearing media tangibly embodying a program of machine-readable instructions executable by a digital data processor to perform the above method.

Such a method may be implemented, for example, by operating the CPU 110*a*/110*b* to execute a sequence of machine-readable instructions. These instructions may reside in various types of signal bearing media.

Thus, this aspect of the invention is directed to a programmed product, comprising signal-bearing media tangibly embodying a program of machine-readable instructions executable by a digital data processor incorporating the CPUs 110*a*/110*b* and hardware above, to perform the method of the invention.

This signal-bearing media may include, for example, a RAM contained within the CPU 110*a*/110*b*, as represented by the fast-access storage for example. Alternatively, as shown in FIG. 12, the instructions may be contained in another signal-bearing media, such as a magnetic data storage diskette 1200, CD-ROM 1202, or a portable memory device 1204, directly or indirectly accessible by the CPU 110*a*/110*b*.

Whether contained in the computer server/CPU 110*a*/110*b*, or elsewhere, the instructions may be stored on a variety of machine-readable data storage media, such as DASD storage (e.g., a conventional "hard drive" or a RAID array), magnetic tape, electronic read-only memory (e.g., ROM, EPROM, or EEPROM), an optical storage device (e.g., CD-ROM, WORM, DVD, digital optical tape, etc.), paper "punch" cards, or other suitable media. In an illustrative embodiment of the invention, the machine-readable instructions may comprise software object code, complied from a language such as "C," etc.

The foregoing description of the specific embodiments will so fully reveal the general nature of the invention that others can, by applying current knowledge, readily modify and/or adapt for various applications such specific embodiments without departing from the generic concept, and, therefore, such adaptations and modifications should and are intended to be comprehended within the meaning and range of equivalents of the disclosed embodiments. It is to be understood that the phraseology or terminology employed herein is for the purpose of description and not of limitation. Therefore, while the embodiments of the invention have been described in terms of embodiments, those skilled in the art will recognize that the embodiments of the invention can be practiced with modification within the spirit and scope of the appended claims.

What is claimed is:

1. A computer-implemented method of translating a computer generated log output message file from a first language to a second language, said method comprising:
   receiving a log output file into a computing device, said log output file containing log output messages in a first language;
   analyzing each character of said log output messages and identifying occurrences of any character, word, or phrase, according to said first language, in a message index file, using said computing device;
   matching, using said computing device, characters, words, and phrases in said log output messages in said first language having occurrence in said message index file to pre-established codes in said message index file, producing a matched message index comprising a string of data for each pre-established code having a match, each element of said string of data corresponding to said pre-established code on an element-by-element basis, said pre-established codes in said message index file identifying a correspondence of characters, words, and phrases in said first language with characters, words, and phrases in a second language corresponding in meaning to said characters, words, and phrases of said first language;
   comparing, on an element-by-element basis, each string of data against every other string of data in said matched message index, using said computing device, identifying elements in a first string of data being completely overlapped by elements in another string of data as ambiguous matches, using said computing device;
   resolving said ambiguous matches, using said computing device, by removing codes from said matched message index having been matched to ones of said characters, words, and phrases that have overlap with characters, words, and phrases matched to different codes;
   translating, using said computing device, said log output messages in said first language into said second language using said codes in said matched message index by substituting characters, words, and phrases in said first language corresponding to matched codes with characters, words, and phrases in said second language corresponding to said matched codes, producing log output messages in said second language, said second language being different from said first language; and
   outputting said log output messages in said second language.

2. The method of claim 1, further comprising:
   indexing, using said computing device, said log output messages in said computer generated log output message file with a message identifier and a language descriptor.

3. The method of claim 1, further comprising:
   processing, using said computing device, said log output messages in said computer generated log output message file into a canonical form by including at least one message variable field in at least one of said log output messages,
   said at least one message variable field further comprising data indicating a position of said at least one message variable field in said log output message.

4. The method of claim 1, further comprising:
   extracting, using said computing device, variable data from said computer generated log output message file in said first language.

5. The method of claim 4, further comprising:
   substituting, using said computing device, said variable data extracted from said computer generated log output message file into translated content of one of said log output messages in said second language.

6. A computer-implemented method of translating a computer generated log output message file from a first language to a second language, said method comprising:
   receiving a computer generated log output message file containing a plurality of log output messages in a first language, into a computing device;
   processing, using said computing device, said plurality of log output messages into a canonical form by including at least one message variable field in at least one of said plurality of log output messages, said at least one message variable field comprising data indicating a position of said at least one message variable field in said at least one of said plurality of log output messages;
   analyzing, using said computing device, each character of each of said plurality of log output messages and identifying occurrences of any character, word, or phrase, according to said first language, in a message index file;
   matching, using said computing device, characters, words, and phrases in said plurality of log output messages in said first language having occurrence in said message index file to pre-established codes in said message index file, producing a matched message index comprising a string of data for each pre-established code having a match, each element of said string of data corresponding to said pre-established code on an element-by-element basis;
   comparing, on an element-by-element basis, each string of data against every other string of data in said matched message index, using said computing device, identifying elements in a first string of data being completely overlapped by elements in another string of data as ambiguous matches, using said computing device;
   resolving said ambiguous matches, using said computing device, by removing codes from said matched message index having been matched to ones of said characters, words, and phrases that have overlap with characters, words, and phrases matched to different codes;
   translating, using said computing device, a message in said plurality of log output messages in said first language into a second language using said codes in said matched message index by substituting characters, words, and phrases in said first language corresponding to matched codes with characters, words, and phrases in said second language corresponding to said matched codes, producing a log output message in said second language corresponding to said message in said plurality of log output messages in said first language, said second language being different from said first language; and
   outputting said log output message in said second language.

7. The method of claim 6, further comprising:
   generating, using said computing device, said pre-established codes in said message index file that identify a correspondence of characters, words, and phrases in said first language with characters, words, and phrases in said second language corresponding in meaning to said characters, words, and phrases of said first language.

8. The method of claim 6, further comprising:
identifying, using said computing device, unknown characters of said computer generated log output message file having no correspondence to at least one of said plurality of messages of said first language.

9. The method of claim 8, further comprising:
removing, using said computing device, said unknown characters of said computer generated log output message file.

10. The method of claim 6, further comprising:
identifying, using said computing device, unique characters of said computer generated log output message file having correspondence to only one of said plurality of messages in said first language.

11. The method of claim 10, further comprising:
substituting, using said computing device, content of one of a corresponding message in said second language for said unique characters.

12. An apparatus that translates a computer generated log output message file from a first language to a second language, said apparatus comprising:
an input device that receives a log output message file containing a plurality of log output messages in a first language;
a processor that:
analyzes each character of a message of said plurality of log output messages in said first language and identifies occurrences of any character, word, or phrase, according to said first language, in a message index file;
matches characters, words, and phrases in said message in said log output message file containing a plurality of log output messages to pre-established codes in said message index file, producing a matched message index comprising a string of data for each pre-established code having a match, each element of said string of data corresponding to said pre-established code on an element-by-element basis;
compares, on an element-by-element basis, each string of data against every other string of data in said matched message index, identifying elements in a first string of data being completely overlapped by elements in another string of data as ambiguous matches;
resolves said ambiguous matches by removing codes matched to ones of said characters, words, and phrases that have overlap with characters, words, and phrases matched to different codes; and
translates said message of said plurality of log output messages in said first language into a second language using said codes in said matched message index by substituting characters, words, and phrases in said first language corresponding to matched codes with characters, words, and phrases in said second language corresponding to said matched codes, producing a log output message in said second language corresponding to said message of said plurality of log output messages in said first language, said second language being different from said first language; and
an output device that outputs said log output message in said second language.

13. The apparatus of claim 12, said processor further processing said plurality of log output messages into a canonical form by including at least one message variable field in at least one of said plurality of log output messages,
said at least one message variable field comprising data indicating a position of said at least one message variable field in said message.

14. The apparatus of claim 12, said processor further extracting variable data from said computer generated log output message file in said first language.

15. The apparatus of claim 14, said processor further substituting said variable data extracted from said computer generated log output message file into translated content of one of said log output messages in said second language.

16. An apparatus that translates a computer generated log output message file from a first language to a second language, said apparatus comprising:
an input device that receives a log output message file containing a plurality of log output messages in a first language;
a processor that:
processes said plurality of log output messages into a canonical form by including at least one message variable field in at least one of said plurality of log output messages, said at least one message variable field comprising data indicating a position of said at least one message variable field in said at least one of said plurality of log output messages;
analyzes each character of said at least one of said plurality of log output messages in said first language and identifies occurrences of any character, word, or phrase, according to said first language, in a message index file;
matches characters, words, and phrases in said at least one of said plurality of log output messages to pre-established codes in said message index file, producing a matched message index comprising a string of data for each pre-established code having a match, each element of said string of data corresponding to said pre-established code on an element-by-element basis;
compares, on an element-by-element basis, each string of data against every other string of data in said matched message index, identifying elements in a first string of data being completely overlapped by elements in another string of data as ambiguous matches;
resolves said ambiguous matches by removing codes matched to ones of said characters, words, and phrases that have overlap with characters, words, and phrases matched to different codes; and
translates said at least one of said plurality of log output messages into a second language using said codes in said matched message index by substituting characters, words, and phrases in said first language corresponding to matched codes with characters, words, and phrases in said second language corresponding to said matched codes, producing a log output message in said second language, said second language being different from said first language; and
an output device that outputs said log output message in said second language.

17. The apparatus of claim 16, said processor further generating said pre-established codes in said message index file that identify a correspondence of characters, words, and phrases in said first language with characters, words, and phrases in said second language corresponding in meaning to said characters, words, and phrases of said first language.

18. The apparatus of claim 17, said processor further identifying unknown characters of said computer generated log output message file having no correspondence to said at least one of said plurality of log output messages of said first language.

19. The apparatus of claim 18, said processor removing said unknown characters of said computer generated log output message file.

20. A tangible computer program product for translating a computer generated log output message file from a first language to a second language, the computer program product comprising a non-transitory computer readable storage medium having program code embodied therewith, the program code being readable and executable by a digital processing apparatus to perform a method comprising:

receiving, by said digital processing apparatus, a log output message in a first language;

analyzing each character of said log output message and identifying occurrences of any character, word, or phrase, according to said first language in a message index file, using said digital processing apparatus;

matching, using said digital processing apparatus, characters, words, and phrases in said log output message to pre-established codes in said message index file, producing a matched message index comprising a string of data for each pre-established code having a match, each element of said string of data corresponding to said pre-established code on an element-by-element basis;

comparing, on an element-by-element basis, each string of data against every other string of data in said matched message index, using said digital processing apparatus, and identifying elements in a first string of data being completely overlapped by elements in another string of data as ambiguous matches, using said digital processing apparatus;

resolving said ambiguous matches, using said digital processing apparatus, by removing codes matched to ones of said characters, words, and phrases that have overlap with characters, words, and phrases matched to different codes;

translating, using said digital processing apparatus, said log output message in said first language into a second language using said codes in said matched message index by substituting characters, words, and phrases in said first language corresponding to matched codes with characters, words, and phrases in said second language corresponding to said matched codes, producing a log output message in said second language corresponding to said log output message in said first language, said second language being different from said first language; and     outputting, using said digital processing apparatus, said log output message in said second language.

\* \* \* \* \*